(12) United States Patent
Maruyama et al.

(10) Patent No.: US 11,513,755 B2
(45) Date of Patent: Nov. 29, 2022

(54) DISPLAY CONTROL DEVICE AND DISPLAY CONTROL METHOD

(71) Applicant: FANUC CORPORATION, Yamanashi (JP)

(72) Inventors: Junpei Maruyama, Yamanashi-ken (JP); Akimasa Matsuo, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 42 days.

(21) Appl. No.: 17/206,904

(22) Filed: Mar. 19, 2021

(65) Prior Publication Data

US 2021/0208835 A1   Jul. 8, 2021

Related U.S. Application Data

(63) Continuation of application No. 16/161,706, filed on Oct. 16, 2018, now Pat. No. 11,169,761.

(30) Foreign Application Priority Data

Oct. 23, 2017   (JP) .............................. JP2017-204419

(51) Int. Cl.
*G06F 3/14*      (2006.01)
*G06F 3/147*     (2006.01)
(Continued)

(52) U.S. Cl.
CPC ............ G06F 3/1446 (2013.01); B29C 45/76 (2013.01); G09G 3/006 (2013.01); G09G 3/34 (2013.01); B29C 45/1774 (2013.01); B29C 2045/7606 (2013.01); G06F 3/147 (2013.01); G06F 3/1454 (2013.01); G09G 3/342 (2013.01); G09G 3/3426 (2013.01); G09G 2356/00 (2013.01)

(58) Field of Classification Search
CPC ...... G06F 3/1446; G06F 3/147; G06F 3/1454; G09G 3/006; G09G 3/34; G09G 2356/00; G09G 3/3426; G09G 3/342; B29C 45/76; B29C 2045/7606; B29C 45/1774
See application file for complete search history.

(56) References Cited

U.S. PATENT DOCUMENTS

2006/0235568 A1* 10/2006 Araki ...................... B29C 45/76
                                                          700/200
2013/0142899 A1*  6/2013 Murata ............... B29C 45/7653
                                                          425/150
2016/0082504 A1*  3/2016 Okochi ............... G06F 3/04842
                                                          425/162

OTHER PUBLICATIONS

English translation (JP 2016030348), Inventor Yoshitaka, assignee Sodick Co LTD (Year: 2016).*

* cited by examiner

*Primary Examiner* — William Boddie
*Assistant Examiner* — Saifeldin E Elnafia
(74) *Attorney, Agent, or Firm* — Robert P. Michal, Esq.; Carter, DeLuca & Farell LLP

(57) ABSTRACT

In a display control device, a first display control unit displays values of a plurality of molding conditions in a first display area, on the basis of layout information including a display size and a display position of the plurality of molding conditions. A data setting unit sets as molding data the values of the plurality of molding conditions that are displayed in the first display area. On the basis of the layout information, and in the same layout as that of the first display area, a second display control unit displays for inspection in a second display area the values of the plurality of molding conditions based on the molding data which are stored in a storage unit.

10 Claims, 11 Drawing Sheets

(51) Int. Cl.
*B29C 45/76* (2006.01)
*G09G 3/00* (2006.01)
*G09G 3/34* (2006.01)
*B29C 45/17* (2006.01)

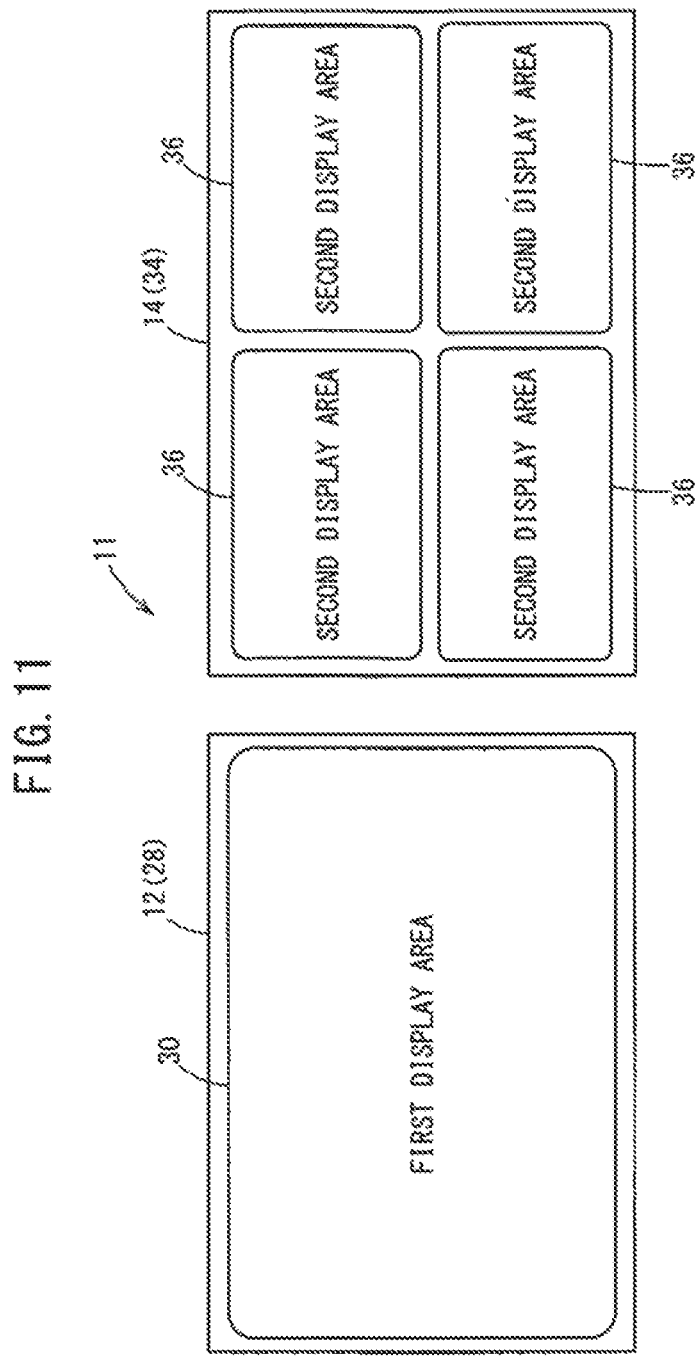

DISPLAY CONTROL DEVICE AND DISPLAY CONTROL METHOD

CROSS-REFERENCE TO RELATED APPLICATION

This application is based upon and claims the benefit of priority from Japanese Patent Application No. 2017-204419 filed on Oct. 23, 2017, which is a continuation of U.S. patent application Ser. No. 16/161,706 filed Oct. 16, 2018, the contents of which are incorporated herein by reference.

BACKGROUND OF THE INVENTION

Field of the Invention

The present invention relates to a display control device and a display control method by which values of a plurality of molding conditions are displayed on a display device.

Description of the Related Art

Conventionally, molding data, which is used in a molding operation of an injection molding machine, is stored in advance in a storage unit, and displaying of the values of a plurality of molding conditions in a display area of a display device has been performed on the basis of such stored molding data.

In Japanese Laid-Open Patent Publication No. 2004-155087, molding condition data (molding data), which are read out from a storage medium (storage unit), are written in a temporary storage area of a controller. A portion of the written molding condition data (values of molding conditions) is displayed in the form of a preview on a display (display device), and if the portion of the data that is displayed in the form of a preview is a target molding condition, the molding condition data written in the temporary storage area are stored in a data storage area as molding condition data used for a molding operation.

SUMMARY OF THE INVENTION

However, in Japanese Laid-Open Patent Publication No. 2004-155087, when setting the molding data, for example, reading and displaying of molding data, which was set in the past, are not carried out. Therefore, it is not easy for an operator of the injection molding machine to appropriately set the molding data.

Thus, an object of the present invention is to provide a display control device and a display control method, which enable an operator to easily set molding data.

A first aspect of the present invention is characterized by a display control device, including a first display control unit configured to display values of a plurality of molding conditions in a first display area of a display device, a data setting unit configured to set as molding data, which are used in a molding operation of an injection molding machine, the values of the plurality of molding conditions that are displayed in the first display area, a storage unit configured to store the molding data that were set by the data setting unit, and a second display control unit configured to display for inspection in a second display area of the display device the values of the plurality of molding conditions, based on the molding data stored in the storage unit, wherein the first display control unit displays the values of the plurality of molding conditions in the first display area, on the basis of layout information including a display size and a display position of the plurality of molding conditions, and on the basis of the layout information, and in the same layout as that of the first display area, the second display control unit displays for inspection in the second display area the values of the plurality of molding conditions.

A second aspect of the present invention is characterized by a display control method, including a first step of, by a first display control unit, displaying values of a plurality of molding conditions in a first display area of a display device, a second step of, by a data setting unit, setting as molding data, which are used in a molding operation of an injection molding machine, the values of the plurality of molding conditions that are displayed in the first display area, a third step of storing in a storage unit the molding data that were set, and a fourth step of, by a second display control unit, displaying for inspection in a second display area of the display device the values of the plurality of molding conditions, based on the molding data stored in the storage unit, wherein, in the first step, the first display control unit displays the values of the plurality of molding conditions in the first display area, on the basis of layout information including a display size and a display position of the plurality of molding conditions, and in the fourth step, on the basis of the layout information, and in the same layout as that of the first display area, the second display control unit displays for inspection in the second display area the values of the plurality of molding conditions.

According to the present invention, since the values of the plurality of molding conditions are displayed in the same layout in both the first display area and the second display area of the display device, the operator of the injection molding machine can easily set the molding data by comparing the values of the plurality of molding conditions displayed in each of the display areas.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 11 is a conceptual diagram of a display example of a display device shown in FIG. 10.

DESCRIPTION OF THE PREFERRED EMBODIMENTS

Preferred embodiments of a display control device and a display control method according to the present invention will be presented and described in detail below with reference to the accompanying drawings.

Configuration of Present Embodiment (Description of Display Control Device 10)

Figure 1:
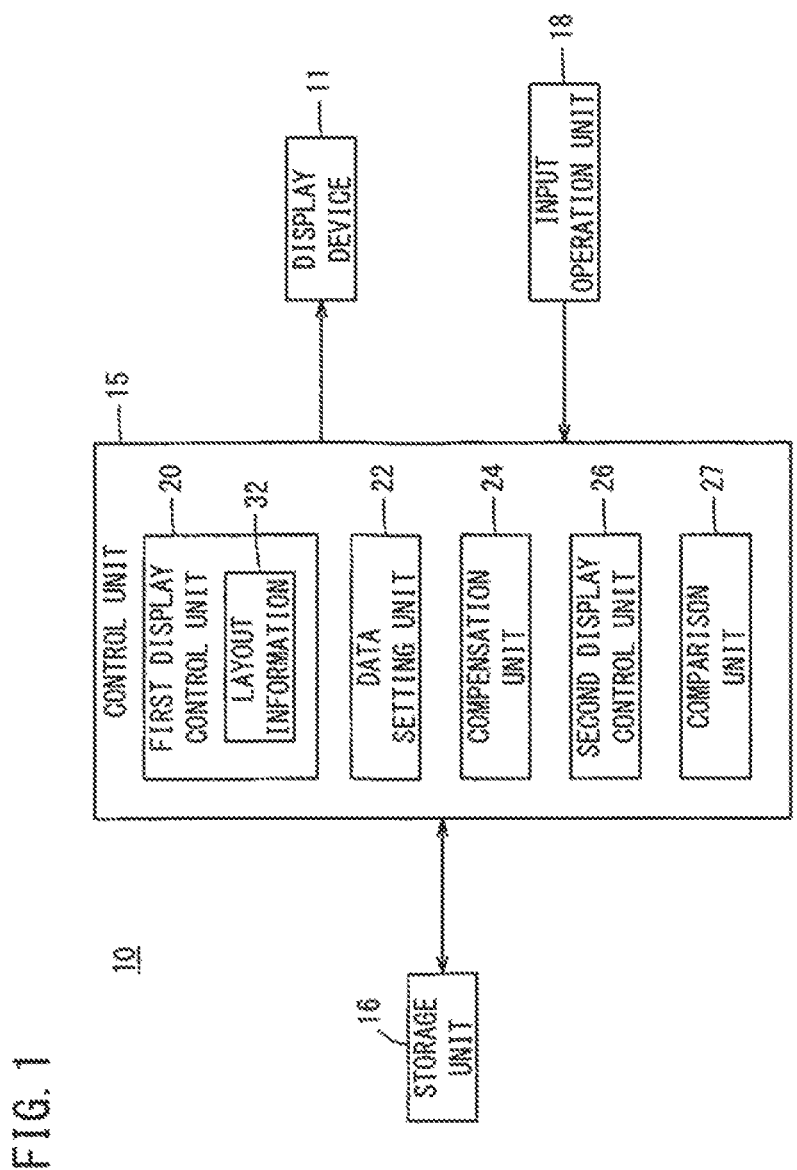
FIG. 1 is a block diagram of a display control device according to an embodiment of the present invention.

As shown in FIG. 1, the display control device 10 of the present embodiment is a display control device for displaying values of a plurality of molding conditions on a display device 11 such as an LCD (liquid crystal display) or the like, on the basis of molding data that are used in a molding operation of a non-illustrated injection molding machine. Moreover, the values of the molding conditions refer to, for example, specific setting values of the molding conditions which are necessary for performing the molding operation, such as an injection pressure, an injection speed, or an injection temperature of the injection molding machine.

The display control device 10 includes a display device 11, a control unit 15 that controls the display device 11, a storage unit 16 in which a plurality of molding data are stored, and an input operation unit 18 which is operated by an operator of the injection molding machine. The input operation unit 18 is a touch panel formed integrally with the display device 11, or an input device such as a keyboard or a mouse or the like which is separate from the display device 11. The display control device 10 implements predetermined processes on the basis of operations of the input operation unit 18 made by the operator.

The control unit 15 comprises a first display control unit 20, a data setting unit 22, a compensation unit 24, a second display control unit 26, and a comparison unit 27.

The first display control unit 20 displays the values of the plurality of molding conditions, which are input by operations of the input operation unit 18 made by the operator, in a first display area 30 on a screen (the display area 44 shown in FIG. 2) of the display device 11. In this case, based on layout information 32 including a display size and a display position of the plurality of molding conditions in the first display area 30, the first display control unit 20 displays the values of the plurality of molding conditions in the first display area 30. In FIG. 1, the layout information 32 is stored in a non-illustrated memory inside the first display control unit 20, however, the layout information 32 may be stored in the storage unit 16 or the like. Further, the layout information 32 may be stored in association with the molding data, or may be stored without being associated with the molding data.

Figure 2:
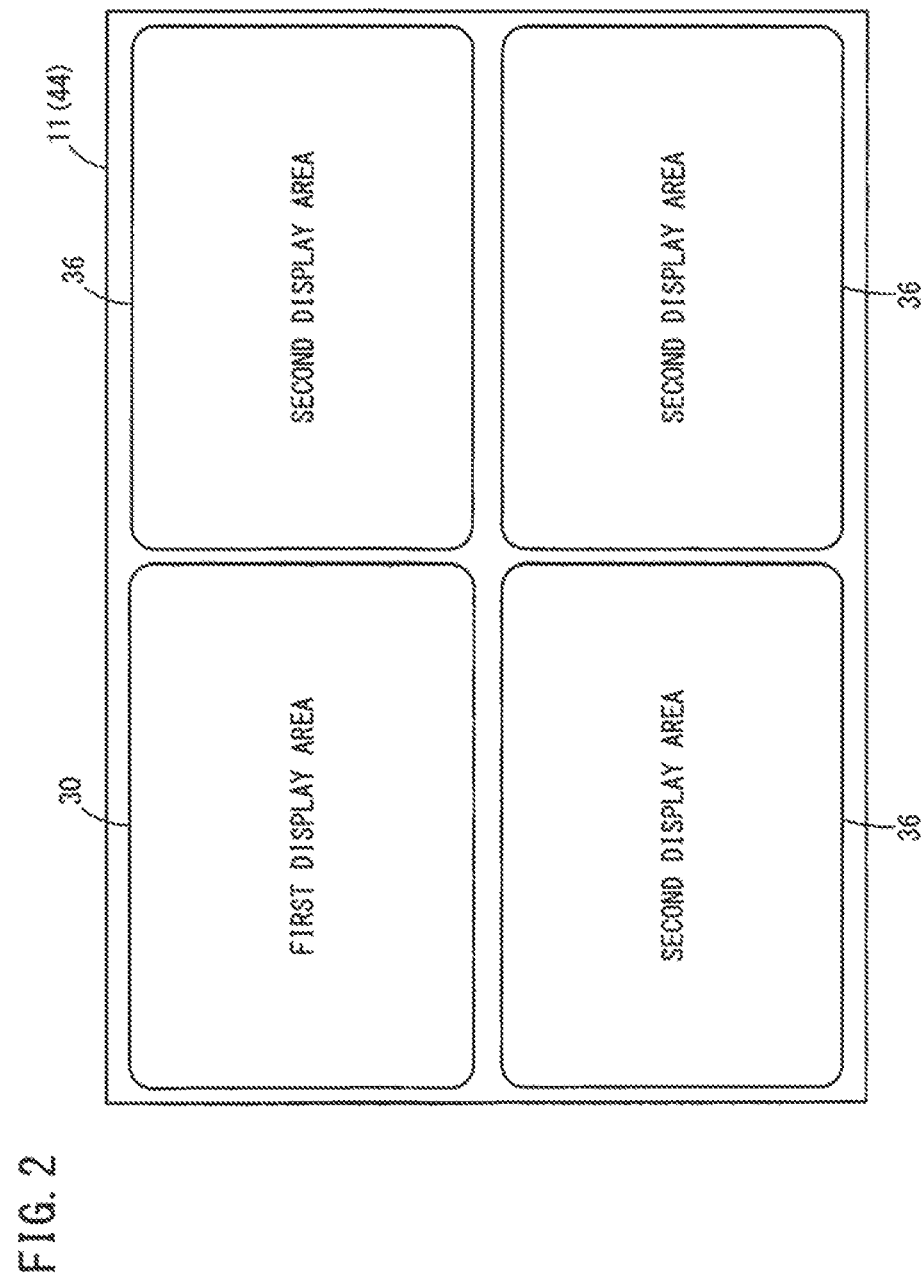
FIG. 2 is a conceptual diagram of a display example of a display device shown in FIG. 1.

As shown in FIG. 2, the first display area 30 is an area in which the values of the plurality of molding conditions are capable of being displayed in the display area 44 of the display device 11. Further, the values of the plurality of molding conditions displayed in the first display area 30 are values of a plurality of molding conditions which are used in a molding operation of the injection molding machine to be performed henceforth, and which are input by operations of the input operation unit 18 made by the operator, or alternatively, are values of a plurality of molding conditions on the basis of molding data used in a current molding operation of the injection molding machine.

Returning to FIG. 1, the data setting unit 22 sets as molding data the values of the plurality of molding conditions input by the operator operating the input operation unit 18 and which are displayed in the first display area 30 (see FIG. 2) of the first display unit 12. The set molding data are displayed in the first display area 30 by the first display control unit 20. In this case, when the operator who has observed the content of the molding data settings displayed in the first display area 30 operates the input operation unit 18, and instructs that the set molding data should be saved, the data setting unit 22 stores the set molding data in the storage unit 16. Among the plurality of molding data stored in the storage unit 16, there are also included the molding data that is used in the current molding operation of the injection molding machine.

Moreover, the first display control unit 20 is capable of reading out molding data that was set in the past by the data setting unit 22 and stored in the storage unit 16, and displaying in the first display area 30 the values of the plurality of molding conditions that make up the read out molding data. If performed in this manner, the operator can set new molding data by overwriting the values of the plurality of molding conditions that are displayed.

The second display control unit 26 reads out one or a plurality of desired molding data from among the plurality of molding data that are stored in the storage unit 16, and displays for inspection in a second display area 36 on the display area 44 of the display device 11 the values of the plurality of molding conditions that make up the read out molding data. More specifically, the values of the plurality of molding conditions displayed in the second display area 36 are displayed for inspection in the second display area 36, as values to be compared with the values of the plurality of molding conditions displayed in the first display area 30 when the molding data are set.

As shown in FIG. 2, the second display area 36 is an area in which the values of the plurality of molding conditions are capable of being displayed in the display area 44 of the display device 11. As an example, in FIG. 2, a case is illustrated in which one first display area 30 and a plurality of second display areas 36 are arranged in a divided manner in the display area 44 of the display device 11. In this case, all of the plurality of second display areas 36 have the same size as that of the first display area 30, and are arranged in a divided manner in different positions. Further, in each of the plurality of second display areas 36, the values of a plurality of molding conditions of different molding data are displayed for inspection.

Figure 3:
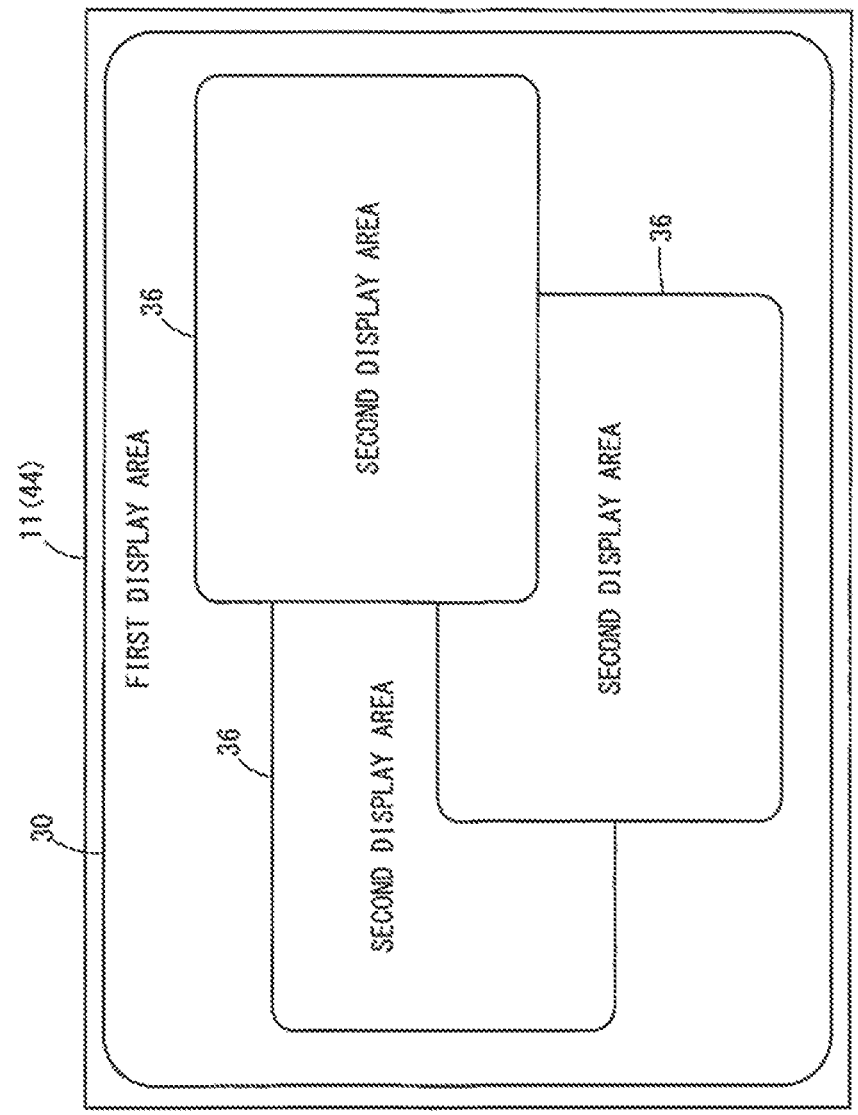
FIG. 3 is a conceptual diagram of another display example that differs from that shown in FIG. 2.
Figure 4:
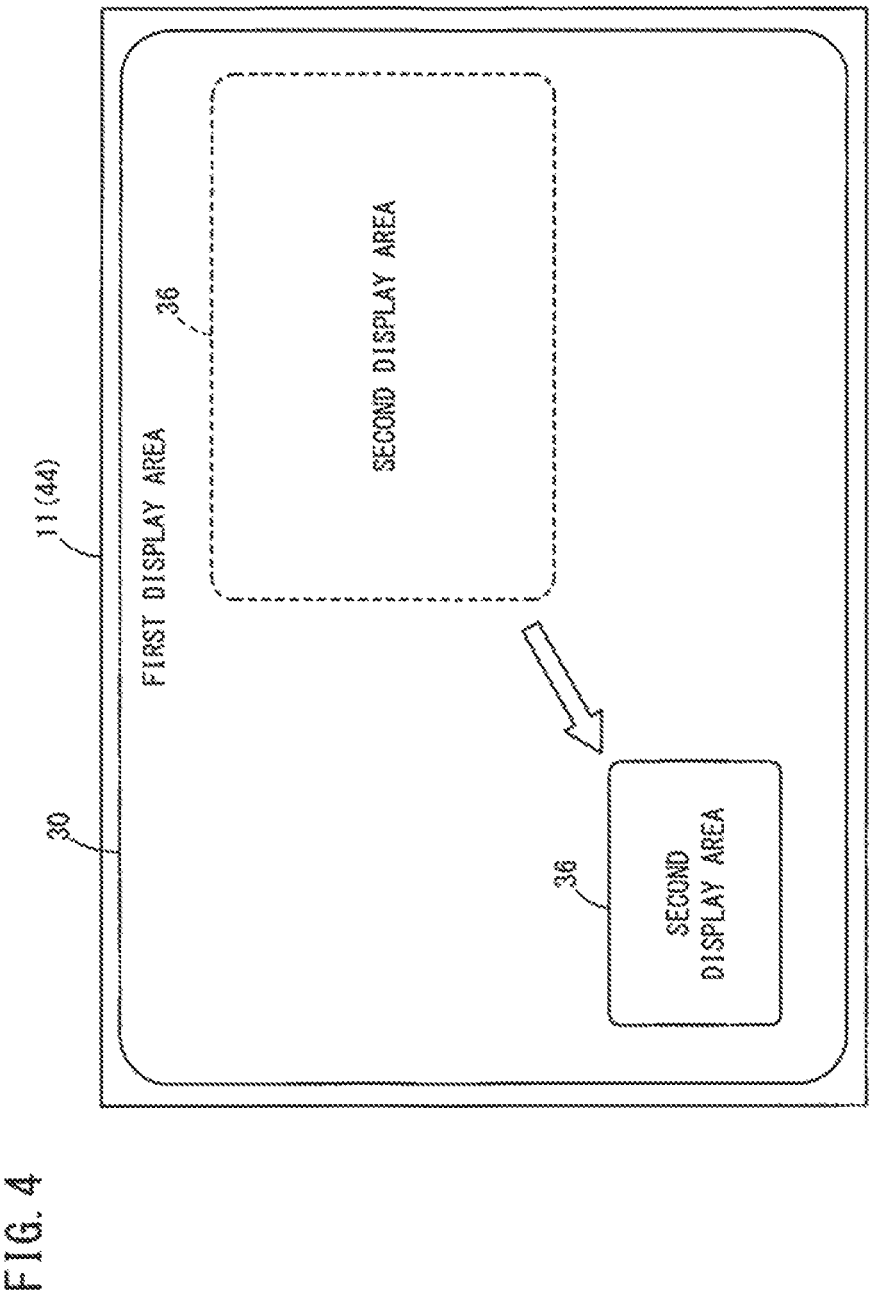
FIG. 4 is a conceptual diagram of another display example that differs from those shown in FIGS. 2 and 3.

Further, in the display control device 10, it is also possible to display the displayed content shown in FIG. 3 or FIG. 4 on the display device 11. In the display example of FIG. 3, a case is shown in which the first display area 30 is displayed as a whole in the display area 44 of the display device 11, and in front of the first display area 30, a plurality of second display areas 36, which are smaller in size than the first display area 30, are displayed in a superimposed manner. In this case, the plurality of second display areas 36 are arranged in a manner so that the display areas partially overlap each other within the first display area 30.

In the display example of FIG. 4, a case is shown in which the first display area 30 is displayed as a whole in the display area 44 of the display device 11, and in front of the first display area 30, a single second display area 36, which is smaller in size than the first display area 30, is displayed in a superimposed manner. Accordingly, the second display area 36 is arranged within the first display area 30. Further, when the operator who has observed the content displayed on the display device 11 operates the input operation unit 18 (see FIG. 1), and instructs that the size and position of the second display area 36 is to be changed, then on the basis of the content instructed by the operator, the second display control unit 26 is capable of changing the size and position of the second display area 36 from the dashed line display area to the solid line display area shown in FIG. 4.

For each of the single second display area 36 or the plurality of second display areas 36, the compensation unit 24 (see FIG. 1) compensates or modifies the layout information 32 of the first display area 30, based on the size and position of the second display area 36 with respect to the display area 44 of the display device 11. Further, based on the layout information 32 compensated or modified by the compensation unit 24, concerning each of the single second display area 36 or the plurality of second display areas 36, the second display control unit 26 displays for inspection the values of the plurality of molding conditions based on the molding data read from the storage unit 16 in the same layout as that of the first display area 30.

In the case that the values of the plurality of molding conditions are displayed in each of the first display area 30 and one or a plurality of the second display areas 36, the comparison unit 27 compares the values of the plurality of molding conditions displayed in the first display area 30 with the values of the plurality of molding conditions displayed for inspection in each of the one or the plurality of second display areas 36. In the case the comparison unit 27 determines that there are differing values of molding conditions, then in relation to the first display area 30, the first display control unit 20 displays with emphasis the values of the molding conditions that differ from the values of the plurality of molding conditions displayed in the one or the plurality of second display areas 36. Further, in the case the comparison unit 27 determines that there are differing values of molding conditions, then in relation to each of the one or the plurality of second display areas 36, the second display control unit 26 displays with emphasis the values of the molding conditions that differ from the values of the plurality of molding conditions displayed in the first display area 30.

(Operations of the Present Embodiment
(Description of Display Control Method)

Next, with reference to FIGS. 5 to 9, a description will be given of operations (the display control method) of the display control device 10. Further, in the explanation of operations, as necessary, descriptions may also be made with reference to FIGS. 1 to 4.

In step S1, the operator of the injection molding machine operates the input operation unit 18 (see FIG. 1), and instructs that reading out of molding data that was set in the past should be performed. The second display control unit 26 reads out a plurality of molding data corresponding to the operation content, from among the plurality of molding data that are stored in the storage unit 16. In order to display each of the plurality of read-out molding data in the second display areas 36, the compensation unit 24 compensates or modifies the layout information 32 of the first display area 30, based on the size and position of the plurality of second display areas 36 with respect to the display area 44 of the display device 11. As a result, in step S2, in relation to each of the plurality of molding data that were read out, the second display control unit 26 displays for inspection in the second display areas 36 the values of the plurality of molding conditions that make up the molding data, on the basis of the layout information 32 that was compensated by the compensation unit 24, and in the same layout as that of the first display area 30.

In the following step S3, the first display control unit 20 causes the first display area 30 to display an input screen for enabling input of values of a plurality of molding conditions based on the layout information 32 of the first display area 30.

Figure 7:
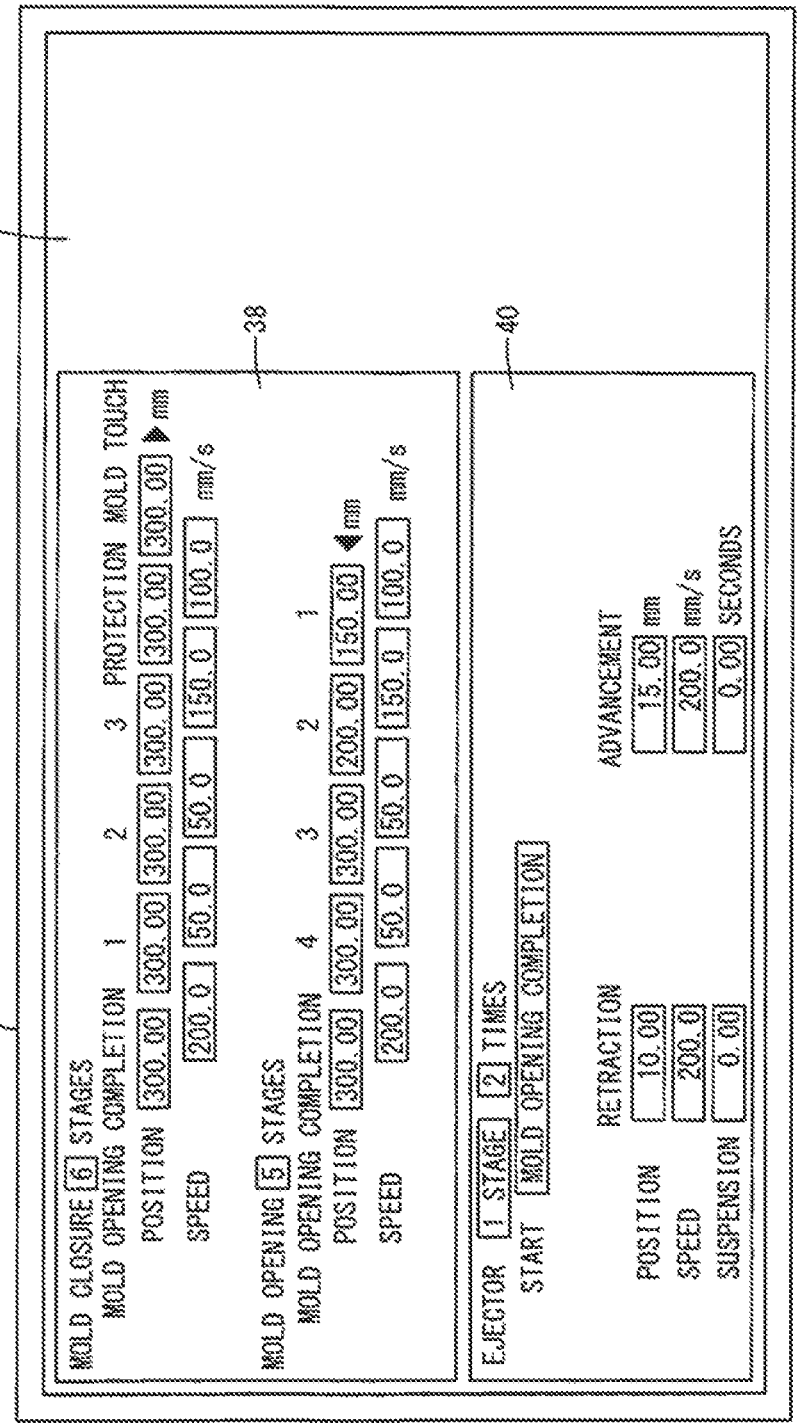
FIG. 7 is a diagram showing a specific display example of a first display area shown in FIGS. 2 to 4.

FIG. 7 shows a specific display example of the input screen of the first display area 30. More specifically, FIG. 7 shows the displayed content of the first display area 30 at a time when setting values (molding data) of a plurality of molding conditions are set from here on, in accordance with operations of the input operation unit 18 made by the operator.

In the first display area 30, there are displayed a first molding condition display section 38 in which molding conditions relating to mold closing and mold opening of the injection molding machine are shown, and a second molding condition display section 40 in which molding conditions relating to an ejector are shown. In the first molding condition display section 38, divided positions when the stroke of a movable mold with respect to a fixed mold is divided into a plurality of segments, and movement speeds of the movable mold in of the respective segments during mold closing and mold opening are displayed as values of the plurality of molding conditions. On the other hand, in the second molding condition display section 40, positions, movement speeds, and movement times of the ejector when a molded product is taken out after opening the mold are displayed as values of the plurality of molding conditions. Moreover, the displayed content shown in FIG. 7 is but one example, and other molding conditions such as an injection pressure, an injection speed, an injection temperature, or the like may be displayed in the first display area 30.

As noted previously, the one or the plurality of second display areas 36 are displayed for inspection in the same layout as that of the first display area 30. Accordingly, in each of the one or the plurality of second display areas 36, values of a plurality of molding conditions corresponding to past molding data are displayed in the same layout as that shown in FIG. 7.

Thus, in step S4 (first step), the operator operates the input operation unit 18 while referring to the values of the plurality of molding conditions that are displayed for inspection in the one or the plurality of second display areas 36, and inputs values of a plurality of molding conditions in order to perform a molding operation of the injection molding machine. The first display control unit 20 updates the displayed content of the first display area 30, by displaying in predetermined positions of the first display area 30 the values of the plurality of molding conditions that were input.

In the following step S5, the comparison unit 27 compares the values of the plurality of molding conditions displayed in the first display area 30 with the values of the plurality of molding conditions displayed in the one or the plurality of second display areas 36. As a result of the comparison between both values, in the case it is determined by the comparison unit 27 that there are differing values of molding conditions, that is, if there is a lack of coincidence between the displayed items (step S6: YES), then in the following step S7, in relation to the one or the plurality of second display areas 36, the second display control unit 26 displays with emphasis the values (displayed items) of the molding conditions that differ from the values of the plurality of molding conditions displayed in the first display area 30.

Further, in relation to the first display area 30, the first display control unit 20 displays with emphasis the values of the molding conditions that differ from the values of the plurality of molding conditions displayed for inspection in the one or the plurality of second display areas 36. Alternatively, the first display control unit 20 and the second display control unit 26 may display with emphasis the values of the differing molding conditions, respectively.

In the event there is no lack of coincidence between the displayed items (step S6: NO), the process of step S7 is skipped over.

Figure 8:
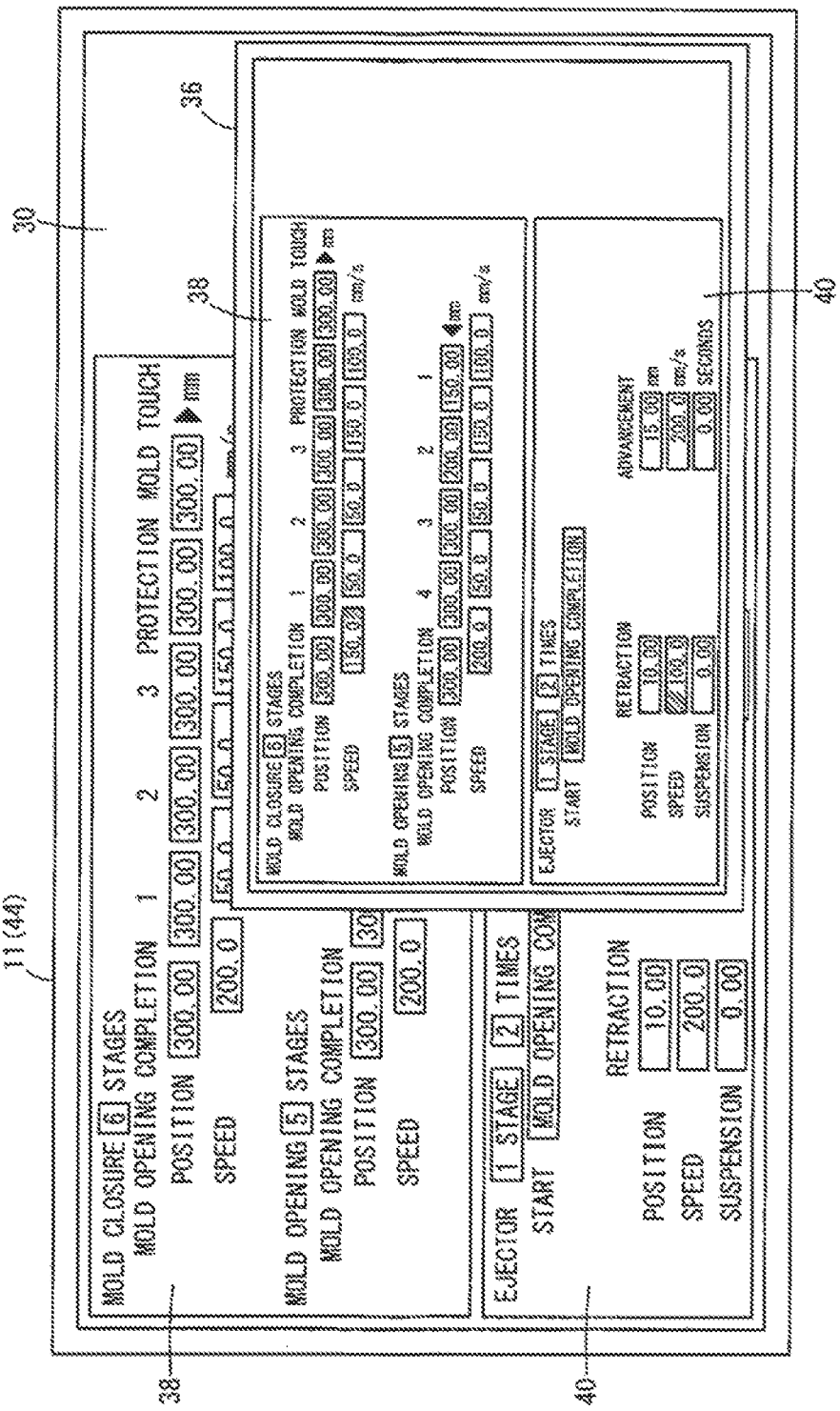
FIG. 8 is a diagram showing a specific display example in a first display area and a second display area shown in FIG. 4.
Figure 9:
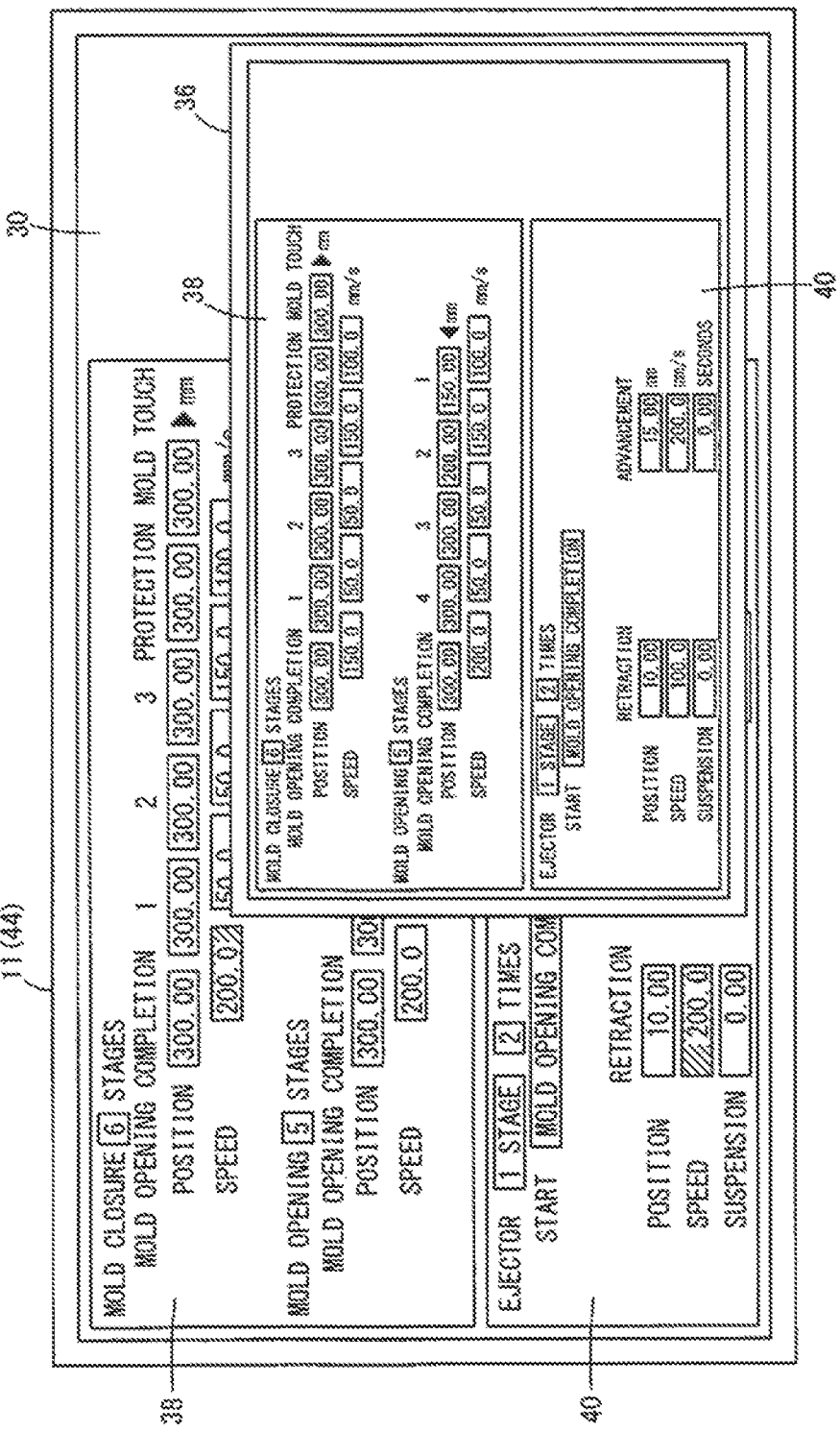
FIG. 9 is a diagram showing another display example that differs from that shown in FIG. 8.

FIGS. 8 and 9 illustrate specific display examples of the values of the plurality of molding conditions in the first display area 30 and the second display area 36. In other words, FIGS. 8 and 9 are specific examples of the content shown in FIG. 4. Moreover, the plurality of molding conditions displayed in the first display area 30 and the second display area 36 in FIGS. 8 and 9 are the same as the specific examples shown in FIG. 7.

In FIGS. 8 and 9, different displayed content are displayed with emphasis between the values of the plurality of molding conditions displayed in the first display area 30, and the values of the plurality of molding conditions displayed in the second display area 36.

More specifically, in FIG. 8, the values of the plurality of molding conditions of the second display area 36 which differ from the values of the plurality of molding conditions of the first display area 30, and more specifically, concerning the respective items of the movement speed "150.0 mm/s" of the movable mold upon mold closure of the first molding condition display section 38 in the second display area 36, and the retraction speed "100.0 mm/s" of the ejector in the second molding condition display section 40, such values are displayed with emphasis by way of a predetermined color (for example, a red color shown with oblique line hatching). Further, in FIG. 9, the values of the plurality of molding conditions of the first display area 30, which differ from the values of the plurality of molding conditions of the second display area 36, and more specifically, concerning the respective items of the movement speed "200.0 mm/s" of the movable mold upon mold closure of the first molding condition display section 38 in the first display area 30, and the retraction speed "200.0 mm/s" of the ejector in the second molding condition display section 40, such values are displayed with emphasis by way of a predetermined color.

In either of these specific examples, the values of the differing molding conditions between the first display area 30 and the second display area 36 are displayed with emphasis in a predetermined color, and therefore, the operator can more easily compare the values of the plurality of molding conditions displayed in the first display area 30 with the values of the plurality of molding conditions displayed in the second display area 36. It is a matter of course that such an emphasized display can also be applied to the display examples shown in FIGS. 2 and 3.

Returning to FIG. 5, in step S8, the data setting unit 22 determines whether or not the values of the plurality of molding conditions shown in the first display area 30 (see FIGS. 2 to 4, FIG. 7, and FIG. 8) should be set as new molding data. For example, in the case that the operator operates the input operation unit 18, and thereby instructs setting of the molding data with the displayed content of the first display area 30 (step S8: YES), then in the following step S9 (second step, third step), and on the basis of the instructed content of the operator, the data setting unit 22 sets the values of the plurality of molding conditions displayed in the first display area 30 as new molding data. The new molding data that is set is displayed in the first display area 30 and stored in the storage unit 16.

On the other hand, in the case that the instructed content to change the values of the plurality of molding conditions displayed in the first display area 30 is input via the input operation unit 18, or in the event there is no instruction from the operator even after a predetermined time period has elapsed (step S8: NO), the processes of steps S4 to S8 are repeated.

By supplying the molding data which was set in the foregoing manner to the injection molding machine, the injection molding machine is made capable of performing a molding operation on the basis of the supplied molding data. Further, by repeating the processes of FIG. 5, the storage unit 16 sequentially stores the molding data that was set by the data setting unit 22.

Figure 5:
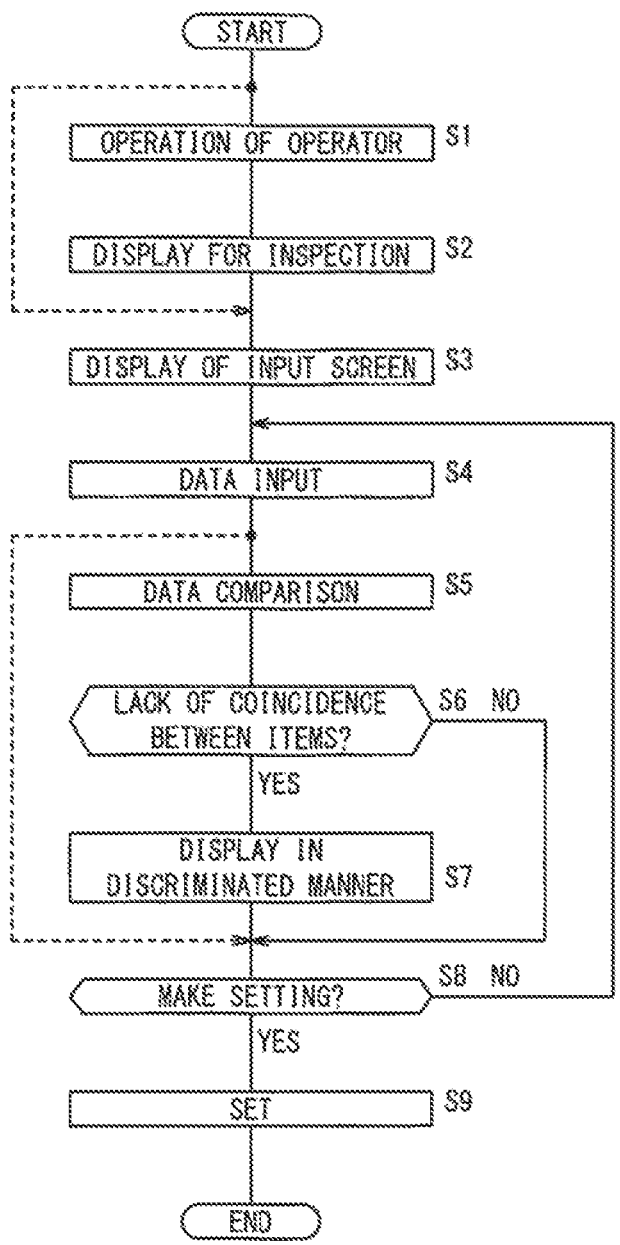
FIG. 5 is a flowchart of the display control device of FIG. 1.

The process described above is a setting operation for the molding data, for a case in which the molding data was stored in advance in the storage unit 16. In FIG. 5, (1) in the case that no molding data is stored in the storage unit 16, (2) in the case that the setting operation of the molding data is performed in a state in which only the first display area 30 is displayed on the display device 11, or (3) in the case that the operator performs the operation of setting the molding data without confirming the displayed content of the second display area 36, the processes of step S1, step S2, and steps S5 to S7 are skipped over, as shown by dashed lines in FIG. 5.

Figure 6:
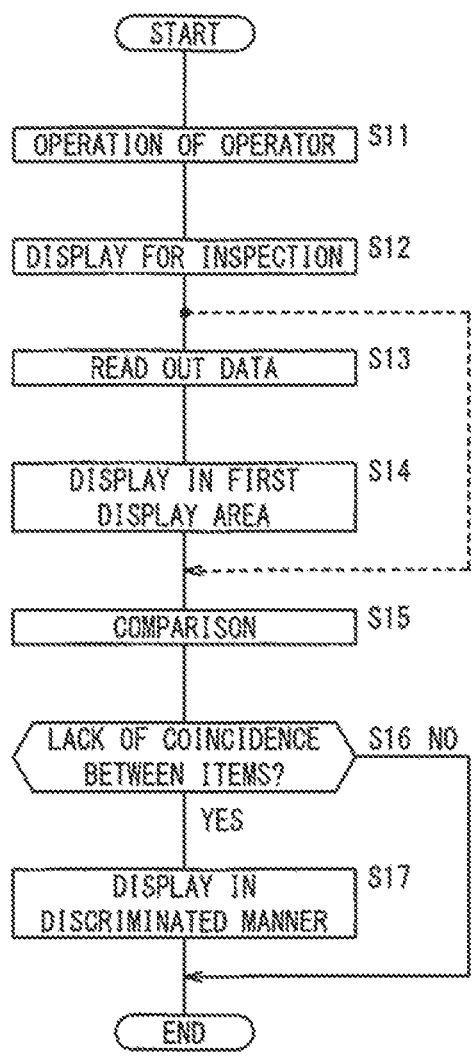
FIG. 6 is a flowchart of the display control device of FIG. 1.

Next, after having set the aforementioned molding data, in the case that the values of the plurality of molding conditions to be used in a molding operation of the injection molding machine to be carried out henceforth, or the values of the plurality of molding conditions that are used in a current molding operation of the injection molding machine are desired to be compared with the values of the plurality of molding conditions that were used in a past molding operation, the process shown in FIG. 6 is performed. The process of FIG. 6 is applied to a situation in which it is desired, for example, during a molding operation, to change the values of the plurality of molding conditions.

In step S11 of FIG. 6, similar to step S1 in FIG. 5, the operator operates the input operation unit 18 (see FIG. 1), and instructs that reading out of past molding data should be performed. The second display control unit 26 reads out a plurality of molding data corresponding to the operation content from among the plurality of molding data that are stored in the storage unit 16. Further, concerning each of the plurality of molding data that were read out, the compensation unit 24 compensates or modifies the layout information 32 of the first display area 30, on the basis of the size and position of the one or the plurality of second display areas 36 with respect to the display area 44 of the display device 11. As a result, in step S12 (third step), in the same manner as in step S2 of FIG. 5, in relation to each of the plurality of molding data that were read out, the second display control unit 26 displays for inspection in the one or the plurality of second display areas 36 the values of the plurality of molding conditions that make up the molding data, on the basis of the compensated layout information 32, and in the same layout as that of the first display area 30.

Next, in step S13, the operator operates the input operation unit 18 (see FIG. 1), and instructs that reading out of the currently set molding data should be performed. The first display control unit 20 reads out the currently set molding data from among the plurality of molding data stored in the storage unit 16, and in the following step S14, displays in the first display area 30 the values of the plurality of molding conditions of the molding data that were read out.

Moreover, as noted previously, after setting of the molding data, the set molding data is displayed in the first display area 30. Therefore, in the case that the currently set molding data is already displayed in the first display area 30, then as shown by the dashed line in FIG. 6, the processes of steps S13 and S14 are skipped over. Further, in the processing shown in FIG. 6, it is also possible to perform the processes of steps S13 and S14 first, and thereafter, to execute the processes of steps S11 and S12.

In the following step S15, in the same manner as step S5 of FIG. 5, the comparison unit 27 compares the values of the plurality of molding conditions displayed in the first display area 30 with the values of the plurality of molding conditions displayed in the one or the plurality of second display areas 36. In this case, if there is a lack of coincidence between the displayed items (step S16: YES), then in the following step S17, in the same manner as step S7 in FIG. 5, the first display control unit 20 and/or the second display control unit 26 displays with emphasis the values of the molding conditions that differ from each other. In the event there is no lack of coincidence between the displayed items (step S16: NO), the process of step S17 is skipped over.

Consequently, while comparing the values of the plurality of molding conditions of the first display area 30, which are displayed in the same layout, with the values of the one or the plurality of molding conditions of the second display area 36, concerning the currently set molding data, the operator is capable of easily changing the values of the plurality of molding conditions. Further, since the values of the differing molding conditions are displayed with emphasis between the currently set molding data and the molding data that is displayed for inspection, it becomes easy to compare the values of the plurality of molding conditions.

Modification of the Embodiment

Next, a modified example of the present embodiment will be described with reference to FIGS. 10 and 11. In the description given below, the same reference numerals are used to designate the same constituent elements as the constituent elements shown in FIGS. 1 to 9, and detailed description of such features will be omitted.

Figure 10:
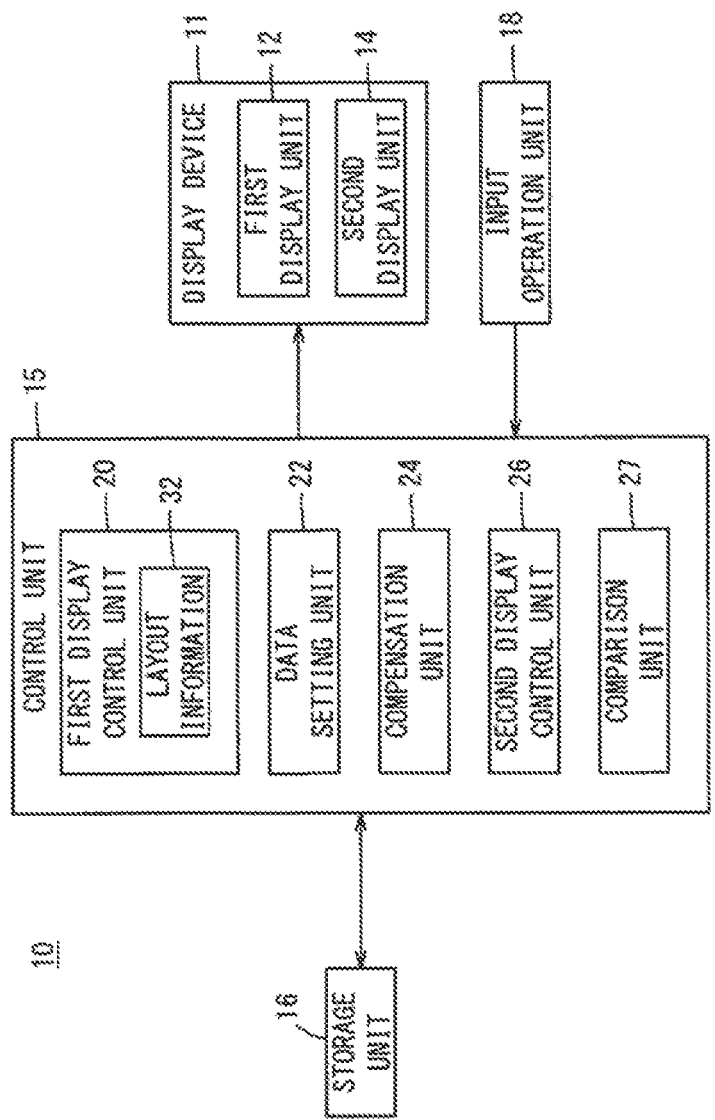
FIG. 10 is a block diagram showing an example of another configuration of the display control device of FIG. 1.

In FIG. 10, the display device 11 differs from the configuration of FIG. 1, in that the display device 11 is equipped with a first display unit 12 having a first display area 30, and a second display unit 14 having one or a plurality of second display areas 36 (see FIG. 11). Accordingly, in the modified example of FIG. 10, as shown in FIG. 11, the first display area 30 is arranged on a screen (display area 28) of the first display unit 12, whereas the one or the plurality of second display areas 36 are arranged on a screen (display area 34) of the second display unit 14.

In this case, the compensation unit 24 compensates or modifies the layout information 32 of the first display area 30, on the basis of the size and position of the one or the plurality of second display areas 36 with respect to the display area 34. Based on the layout information 32 that has been compensated or modified, concerning each of the single second display area 36 or the plurality of second display areas 36, the second display control unit 26 displays for inspection the values of the plurality of molding conditions that make up the molding data, in the same layout as that of the first display area 30.

Technical Concepts Obtained from the Embodiment

Technical concepts that can be grasped from the above-described embodiment will be described below.

The display control device (10) includes the first display control unit (20) configured to display values of the plurality of molding conditions in the first display area (30) of the display device (11), the data setting unit (22) configured to set as molding data, which are used in a molding operation of the injection molding machine, the values of the plurality of molding conditions that are displayed in the first display area (30), the storage unit (16) configured to store the molding data that were set by the data setting unit (22), and the second display control unit (26) configured to display for inspection in the second display area (36) of the display device (11) the values of the plurality of molding conditions, based on the molding data stored in the storage unit (16), wherein the first display control unit (20) displays the values of the plurality of molding conditions in the first display area (30), on the basis of layout information (32) including a display size and a display position of the plurality of molding conditions, and on the basis of the layout information (32), and in the same layout as that of the first display area (30), the second display control unit (26) displays for inspection in the second display area (36) the values of the plurality of molding conditions.

Consequently, since the values of the plurality of molding conditions are displayed in the same layout in both the first display area (30) and the second display area (36) of the display device (11), the operator of the injection molding machine can easily set the molding data by comparing the values of the plurality of molding conditions displayed in each of the display areas (30, 36).

The first display area (30) is larger than the second display area (36), and the second display area (36) is located inside the first display area (30).

In accordance with this feature, when the operator sets the molding data while viewing the first display area (30), the operator can easily read and inspect the values of the plurality of molding conditions displayed in the second display area (36).

The second display control unit (26) displays for inspection the second display area (36) in front of the first display area (30).

In this case as well, when the operator sets the molding data while viewing the first display area (30), the operator can easily read and inspect the values of the plurality of molding conditions displayed in the second display area (36).

The display device (11) is equipped with the first display unit (12) including the first display area (30), and the second display unit (14) including the second display area (36).

Even in the case that the first display area (30) and the second display area (36) are displayed respectively in the two display units (12, 14), the values of the plurality of molding conditions are displayed in the same layout. As a result, the operator can easily set the molding data by comparing the values of the plurality of molding conditions displayed in the respective display areas (30, 36).

The display control device (10) further includes the compensation unit (24) configured to modify the layout information (32) on the basis of the size of the second display area (36), and the second display control unit (26) displays for inspection in the second display area (36), on the basis of the modified layout information (32), and in the same layout as that of the first display area (30), the values of the plurality of molding conditions based on the molding data.

In accordance with this feature, the operator can easily compare the values of the plurality of molding conditions which are displayed respectively in the first display area (30) and the second display area (36).

The display device (11) includes a plurality of the second display areas (36), the compensation unit (24) modifies the layout information (32) on the basis of the size and position of the second display areas (36) for each of the plurality of second display areas (36), and the second display control unit (26) displays for inspection in the plurality of second display areas (36), on the basis of the plurality of the modified layout information (32), and in the same layout as that of the first display area (30), the values of the plurality of molding conditions based on each of a plurality of the molding data.

Consequently, the operator can easily compare the values of the plurality of molding conditions displayed in the first display area (30) and the values of the plurality of molding conditions displayed for inspection in each of the plurality of second display areas (36).

The second display control unit (26) changes the size and position of the second display area (36) according to the operation of the operator.

Owing to this feature, the second display area (36) can be displayed for inspection at a size and position that are easy for the operator to see.

The display control device (10) further includes the comparison unit (27) configured to compare with each other the values of the plurality of molding conditions displayed in the first display area (30), and the values of the plurality of molding conditions displayed for inspection in the second display area (36), wherein, in the event that the comparison unit (27) determines that there are differing values of molding conditions, the second display control unit (26) displays with emphasis the values of the molding conditions that differ from the values of the plurality of molding conditions displayed in the first display area (30).

Consequently, the values of the differing molding conditions can be easily specified, and therefore, setting of the molding data can be performed more easily.

The display control device (10) further includes the comparison unit (27) configured to compare with each other the values of the plurality of molding conditions displayed in the first display area (30), and the values of the plurality of molding conditions displayed for inspection in the second display area (36), wherein, in the event that the comparison unit (27) determines that there are differing values of molding conditions, the first display control unit (20) displays with emphasis the values of the molding conditions that differ from the values of the plurality of molding conditions displayed for inspection in the second display area (36).

In this case as well, the values of the differing molding conditions can be easily specified, and therefore, setting of the molding data can be performed more easily.

The first display control unit (20) displays in the first display area (30) the values of the plurality of molding conditions that are used in a molding operation of the injection molding machine to be carried out henceforth.

In accordance with this feature, it is possible to easily set the molding data.

The first display control unit (20) displays the values of the plurality of molding conditions in the first display area (30), on the basis of the molding data set by the data setting unit (22), and the second display control unit (26) displays the values of the plurality of molding conditions in the second display area (36), on the basis of the molding data, which are set by the data setting unit (22) and stored in the storage unit (16) and differs from the molding data used for display of the first display area (30).

In accordance with this feature, while comparing the values of the plurality of molding conditions displayed in the first display area (30) with the values of the plurality of molding conditions displayed in the second display area (36), the operator is capable of performing operations such as setting or changing the molding data suitable for the molding operation of the injection molding machine.

The first display control unit (20) displays in the first display area (30) the values of the plurality of molding conditions, on the basis of the molding data, which are set by the data setting unit (22) and used in a current molding operation of the injection molding machine.

In accordance with this feature, while comparing the values of the plurality of molding conditions displayed in the first display area (30) with the values of the plurality of molding conditions displayed in the second display area (36), the operator is capable of changing the molding data during the molding operation to appropriate values.

The display control method includes a first step of, by the first display control unit (20), displaying the values of the plurality of molding conditions in the first display area (30) of the display device (11), a second step of, by the data setting unit (22), setting as molding data, which are used in a molding operation of an injection molding machine, the values of the plurality of molding conditions that are displayed in the first display area (30), a third step of storing in the storage unit (16) the molding data that were set, and a fourth step of, by the second display control unit (26), displaying for inspection in the second display area (36) of the display device (11) the values of the plurality of molding conditions, based on the molding data stored in the storage unit (16), wherein, in the first step, the first display control unit (20) displays the values of the plurality of molding conditions in the first display area (30), on the basis of the layout information (32) including a display size and a display position of the plurality of molding conditions, and in the fourth step, on the basis of the layout information (32), and in the same layout as that of the first display area (30), the second display control unit (26) displays for inspection in the second display area (36) the values of the plurality of molding conditions.

Consequently, since the values of the plurality of molding conditions are displayed in the same layout in both the first display area (30) and the second display area (36) of the display device (11), the operator of the injection molding machine can easily set the molding data by comparing the values of the plurality of molding conditions displayed in each of the display areas (30, 36).

The present invention is not particularly limited to the embodiments described above, and various modifications are possible without departing from the essence and gist of the present invention.

What is claimed is:

1. A display control device, comprising:
a first display control unit configured to display in a first display area of a display device, based on predetermined layout information, an input screen into which an operator inputs values of a plurality of molding conditions used for molding operation of an injection molding machine, and display, on the input screen, the values of the plurality of molding conditions having been input by the operator operating an input operation unit;
a data setting unit configured to set, as molding data that is used in a current molding operation of the injection molding machine, the values of the plurality of molding conditions displayed on the input screen in a case where a setting instruction is given by the operator operating the input operation unit;
a storage unit configured to store the molding data that has been set by the data setting unit; and
a second display control unit configured to display for inspection in a second display area of the display device, while the input screen is displayed and at least before the setting instruction is given by the operator, values of a plurality of molding conditions that make up the molding data selected by the operator operating the input operation unit, of a plurality of molding data items stored in the storage unit and used for past molding operation of the injection molding machine,
wherein the first display control unit displays the input screen in the first display area based on the layout information including a display size and a display position where the values of the plurality of molding conditions are input and displayed, and
the second display control unit displays in the second display area, based on the layout information, an inspection screen and displays on the inspection screen values of a plurality of molding conditions that make up the molding data selected by the operator operating the input operation unit, the second display control unit being configured to display on the inspection screen a same type of a value of a molding condition as each of the values of the plurality of molding conditions displayed in the first display area at a display position in the second display area that corresponds to a display position in the first display area, wherein each of the values of the plurality of molding conditions are displayed on the inspection screen in the display size corresponding to a ratio of a size of the second display area to a size of the first display area.

2. The display control device according to claim 1, wherein:
the first display area is larger than the second display area; and
the second display area is located inside the first display area.

3. The display control device according to claim 2, wherein the second display control unit displays for inspection the second display area in front of the first display area.

4. The display control device according to claim 1, wherein the display device comprises a first display unit including the first display area, and a second display unit including the second display area.

5. The display control device according to claim 1, further comprising:
a compensation unit configured to modify the layout information based on the size of the second display area; and
the second display control unit displays in the inspection screen, based on the modified layout information, and values of a plurality of molding conditions that make up the molding data selected by the operator operating the input operation unit.

6. The display control device according to claim 5, wherein:
the display device includes a plurality of the second display areas;
the compensation unit modifies the layout information, based on the size and position of the second display areas for each of the plurality of second display areas; and
the second display control unit displays in a plurality of screens for inspection, based on a plurality of modified layout information items, values of a plurality of molding conditions that make up the molding data selected by the operator operating the input operation unit.

7. The display control device according to claim 1, wherein the second display control unit changes the size and position of the second display area in response to the operator's operation of the input operation unit.

8. The display control device according to claim 1, further comprising:
a comparison unit configured to compare with each other the values of the plurality of molding conditions displayed in the input screen, and the values of the plurality of molding conditions displayed in the inspection screen;
wherein, in an event that the comparison unit determines that there are differing values of molding conditions, the second display control unit displays with emphasis the values of the molding conditions that differ from the values of the plurality of molding conditions displayed in the input screen.

9. The display control device according to claim 1, further comprising:
a comparison unit configured to compare with each other the values of the plurality of molding conditions displayed in the input screen, and the values of the plurality of molding conditions displayed in the inspection screen;
wherein, in an event that the comparison unit determines that there are differing values of molding conditions, the first display control unit displays with emphasis the values of the molding conditions that differ from the values of the plurality of molding conditions displayed in the inspection screen.

10. A display control method, comprising:
a first step of selecting, of a plurality of molding data items that have been used for past molding operation of an injection molding machine and stored in a storage unit, the molding data corresponding to an operation of an input operation unit by an operator;
a second step of displaying for inspection, in a second display area of a display device, values of a plurality of molding conditions that make up the molding data, based on predetermined layout information with respect to an input screen where the operator inputs values of a plurality of molding conditions that are displayed in a first display area of the display device and are used for molding operation of the injection molding machine;
a third step of displaying the input screen in the first display area based on the layout information;
a fourth step of displaying on the input screen, when the operator referring to values of a plurality of molding conditions that make up the molding data displayed for inspection in the second display area inputs values of a plurality of molding conditions used for current molding operation of the injection molding machine by operating the input operation unit, the values of the plurality of molding conditions that have been input;
a fifth step of setting, as molding data used for the current molding operation, the values of the plurality of molding conditions displayed in the input screen when a setting instruction is given by the operator operating the input operation unit;
a sixth step of storing in the storage unit the molding data that has been set,
wherein in the second step, based on the layout information including a display position and a display size of the plurality of molding conditions, an inspection screen is displayed in the second display area, and values of a plurality of molding conditions that make up the molding data selected by the operator operating the input operation unit are displayed on the inspection screen, the inspection screen displaying a same type of a value of a molding condition as each of the values of the plurality of molding conditions displayed in the first display area at a display position in the second display area that corresponds to a display position in the first display area, wherein each of the values of the plurality of molding conditions are displayed on the inspection screen in the display size corresponding to a ratio of a size of the second display area to a size of the first display area.

* * * * *